US011987067B2

(12) United States Patent
Lesur

(10) Patent No.: US 11,987,067 B2
(45) Date of Patent: May 21, 2024

(54) MULTI-PAGE PERSONALIZATION FOR A MULTI-PAGE SECURITY DOCUMENT

(71) Applicant: THALES DIS FRANCE SAS, Meudon (FR)

(72) Inventor: Jean-Luc Lesur, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 17/624,615

(22) PCT Filed: Jul. 2, 2020

(86) PCT No.: PCT/EP2020/068682
§ 371 (c)(1),
(2) Date: Jan. 4, 2022

(87) PCT Pub. No.: WO2021/004890
PCT Pub. Date: Jan. 14, 2021

(65) Prior Publication Data

US 2022/0258522 A1 Aug. 18, 2022

(30) Foreign Application Priority Data

Jul. 11, 2019 (EP) .................................... 19305931

(51) Int. Cl.
*B42D 25/24* (2014.01)
*B42D 25/337* (2014.01)
(Continued)

(52) U.S. Cl.
CPC ......... *B42D 25/378* (2014.10); *B42D 25/337* (2014.10); *B42D 25/351* (2014.10); *B42D 25/41* (2014.10); *B42D 25/24* (2014.10)

(58) Field of Classification Search
CPC ...... B42D 25/24; B42D 25/351; B42D 25/41; B41M 3/14
See application file for complete search history.

(56) References Cited

U.S. PATENT DOCUMENTS 4,234,214 A * 11/1980 Lee ........................ B42D 25/29 346/2
4,738,471 A * 4/1988 Nielsen ................... B42F 21/00 283/67
(Continued)

FOREIGN PATENT DOCUMENTS

EP 2511104 A1 10/2012
EP 3785927 A1 * 3/2021 ............. B42D 25/24
(Continued)

OTHER PUBLICATIONS

WO-2016000817-A1 English Translation (Year: 2016).*
(Continued)

*Primary Examiner* — Kyle R Grabowski

(57) ABSTRACT

Personalizing a multipage security document by placing a laser-alterable ink layer on a personalization area of an edge of each of the sequence of pages. The method includes revealing a portion of the personalization area of each of the sequence of pages relative to a pages above said each of the sequence of pages such that the personalization portion of each two consecutive pages in said sequence of pages are located adjacent to one another thereby producing a two-dimensional multi-page personalization section, and creating a pattern on the two-dimensional multi-page personalization section by altering the inked personalization area in the revealed portion of each page of said sequence of pages by exposing said revealed portions to a laser, such that a pattern is visible when the revealed portions of a sequence of pages are viewed simultaneously.

14 Claims, 17 Drawing Sheets

(51) Int. Cl.

| | |
|---|---|
| ***B42D 25/351*** | (2014.01) |
| ***B42D 25/378*** | (2014.01) |
| ***B42D 25/41*** | (2014.01) |

(56) References Cited

U.S. PATENT DOCUMENTS

| | | | | |
|---|---|---|---|---|
| 4,877,269 | A * | 10/1989 | Callaghan | B42D 1/00 281/38 |
| 6,478,337 | B1 * | 11/2002 | Toda | B42F 21/00 283/42 |
| 2003/0107164 | A1 * | 6/2003 | Todie | B42D 15/0073 270/5.02 |
| 2010/0164220 | A1 * | 7/2010 | Kaskiala | B42D 25/00 219/121.69 |
| 2017/0096026 | A1 * | 4/2017 | Sailer | B42D 25/29 |

FOREIGN PATENT DOCUMENTS

| | | | | |
|---|---|---|---|---|
| WO | WO-2011015798 | A1 * | 2/2011 | B41M 3/148 |
| WO | WO-2016000817 | A1 * | 1/2016 | B42D 25/20 |
| WO | 2016/192818 | A1 | 12/2016 | |

OTHER PUBLICATIONS

International Search Report (PCT/ISA/210) and Written Opinion (PCT/ISA/237) dated Aug. 4, 2021, by the European Patent Office as the International Searching Authority for International Application No. PCT/EP2020/068682 (WO2021/004890)—[13 pages].

* cited by examiner

A second document with different cutouts

A second document with different cutouts combined

MULTI-PAGE PERSONALIZATION FOR A MULTI-PAGE SECURITY DOCUMENT

BACKGROUND OF THE INVENTION

The present invention relates, generally, to multi-page security documents, and, more particularly, to mechanisms for protecting multi-page security documents against counterfeiting.

Multi-page security documents, for example, passports, typically consist of a cover, a data page, and a number of internal pages that may be used for providing some additional rights to the holder of a multi-page security document. For example, passports contain a number of pages on which visas may be added.

One mechanism for producing a counterfeit of a multi-page security document is to swap a page from one document into another. As the internal pages provide very little security of their own (typically limited to a security guilloche pattern or some other form of security paper) it is very difficult for a person scrutinizing such a document to determine whether the document contains the pages that were originally bound together when the document was first produced or personalized.

From the foregoing it is apparent that there is a need for an improved method to protect multi-page security documents against counterfeiting by swapping pages.

SUMMARY

A method for personalizing a multipage security document by placing a laser-alterable ink layer on a personalization area of an edge of each of the sequence of pages, revealing a portion of the personalization area of each of the sequence of pages relative to a pages above said each of the sequence of pages such that the personalization portion of each two consecutive pages in said sequence of pages are located adjacent to one another thereby producing a two-dimensional multi-page personalization section, and creating a pattern on the two-dimensional multi-page personalization section by altering the inked personalization area in the revealed portion of each page of said sequence of pages by exposing said revealed portions to a laser, such that a pattern is visible when the revealed portions of a sequence of pages are viewed simultaneously.

In one aspect, revealing the portion of each page of the sequence of pages by angle-cutting a portion of the edge of the multipage security document such that for any two adjacent sheets of the multi-page personalization section, a portion of a lower sheet of the two adjacent sheets is exposed beyond an edge of an upper sheet of the two adjacent sheets. In another aspect, revealing the portion of each page of the sequence of pages by bending the security document such that for any two adjacent sheets of the personalization zone, a portion of a lower of said two adjacent sheets is exposed beyond an edge of an upper of the two adjacent sheets.

The laser-alterable ink layer may be lines of a guilloche pattern on the exposed portion of each page and wherein the step of altering the inked personalization area in the revealed portion of each page comprises exposing portions of the lines of the guilloche pattern to laser and thereby altering the lines of the guilloche pattern.

The exposure to laser changes the original color of the laser-alterable ink layer. In one embodiment, the exposure to laser bleaches the laser-alterable ink layer.

In an aspect, at least one upper sheet may contain an internal cutout window revealing an internal portion of a lower sheet such that laser personalization of the upper sheet causes personalization on the lower sheet that corresponds to the personalization of the upper sheet wherein the personalization pattern produced on the lower sheet in the see-through window fits like a puzzle piece into the personalization pattern produced on the upper sheet.

In another aspect, at least one upper sheet contains an irregular edge revealing an irregularly shaped personalization area of a lower sheet such that laser personalization of the upper sheet causes personalization on the lower sheet that corresponds to the personalization of the upper sheet wherein the personalization pattern produced on the lower sheet in the irregularly shaped personalization area fits like a puzzle piece into the personalization pattern produced on the upper sheet.

To achieve those and other advantages, and in accordance with the purpose of the invention as embodied and broadly described, the invention proposes a method for personalizing a multipage security document, the method comprising:

on a sequence of pages:

placing a laser-alterable ink layer on a personalization area of an edge of each of the sequence of pages;

revealing a portion of the personalization area of each of the sequence of pages relative to a page above said each of the sequence of pages such that the personalization portion of each two consecutive pages in said sequence of pages are located adjacent to one another thereby producing a two-dimensional multi-page personalization section;

creating a pattern on the two-dimensional multi-page personalization section by altering the inked personalization area in the revealed portion of each page of said sequence of pages by exposing said revealed portions to a laser, such that a pattern is visible when the revealed portions of a sequence of pages are viewed simultaneously.

According to an aspect of the present invention the method comprises a step of revealing said portion of each page of said sequence of pages by angle-cutting a portion of the edge of the multipage security document such that for any two adjacent sheets of said multi-page personalization section, a portion of a lower sheet of said two adjacent sheets is exposed beyond an edge of an upper sheet of said two adjacent sheets.

According to an aspect of the present invention the method comprises a step of revealing said portion of each page of said sequence of pages by bending the security document such that for any two adjacent sheets of said personalization zone, a portion of a lower of said two adjacent sheets is exposed beyond an edge of an upper of said two adjacent sheets.

According to an aspect of the present invention the laser-alterable ink layer are lines of a guilloche pattern on the exposed portion of each page and wherein the step of altering the inked personalization area in the revealed portion of each page comprises exposing portions of the lines of the guilloche pattern to laser and thereby altering the lines of the guilloche pattern.

According to an aspect of the present invention the exposure to laser changes the original color of the laser-alterable ink layer.

According to an aspect of the present invention the exposure to laser bleaches the laser-alterable ink layer.

According to an aspect of the present invention at least one upper sheet contains an internal cutout window revealing an internal portion of a lower sheet such that laser personalization of the upper sheet causes personalization on the lower sheet that corresponds to the personalization of the upper sheet wherein the personalization pattern produced on the lower sheet in the see-through window fits like a puzzle piece into the personalization pattern produced on the upper sheet.

According to an aspect of the present invention at least one upper sheet contains an irregular edge revealing an irregularly shaped personalization area of a lower sheet such that laser personalization of the upper sheet causes personalization on the lower sheet that corresponds to the personalization of the upper sheet wherein the personalization pattern produced on the lower sheet in the irregularly shaped personalization area fits like a puzzle piece into the personalization pattern produced on the upper sheet.

DETAILED DESCRIPTION OF THE INVENTION

Figure 1:
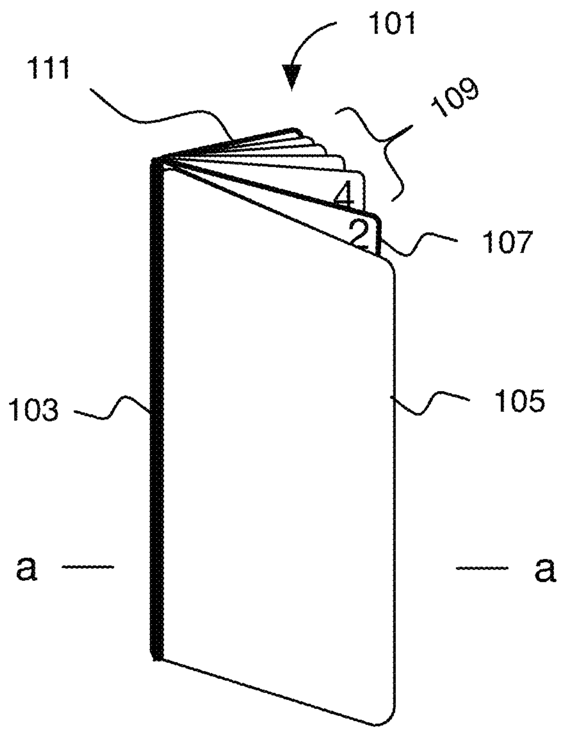
FIG. 1 is a perspective view illustration of a multi-page security document.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The herein described technology provides a mechanism for personalizing a multi-page security document, e.g., a passport, with a personalized rainbow text printed along an edge of the multi-page security document. The rainbow text is created by altering ink on a sequence of pages of the multi-page security document by "writing" the rainbow text onto the ink of the several pages that make up the sequence of pages using a multi-color laser. The ink that is altered by exposure to the laser is either offset ink already present in the pages of the multi-page document, e.g., in the form of lines that make up a guilloche security image present in the pages, or ink, such as offset or other laser-alterable ink placed on a portion of each page for the purpose of laser-alteration as described herein below.

FIG. 1 is a perspective view illustration of a multi-page security document 101 having three consecutive sheets, which are referred to herein as the front cover 105, a second sheet 107, typically a data page, and a number of interior sheets 109 behind the second sheet 107, and a back cover 111, respectively. Each sheet has a front page and a back page. The sheets 105-107 are bound together along one side using a binding 103.

Figure 2:
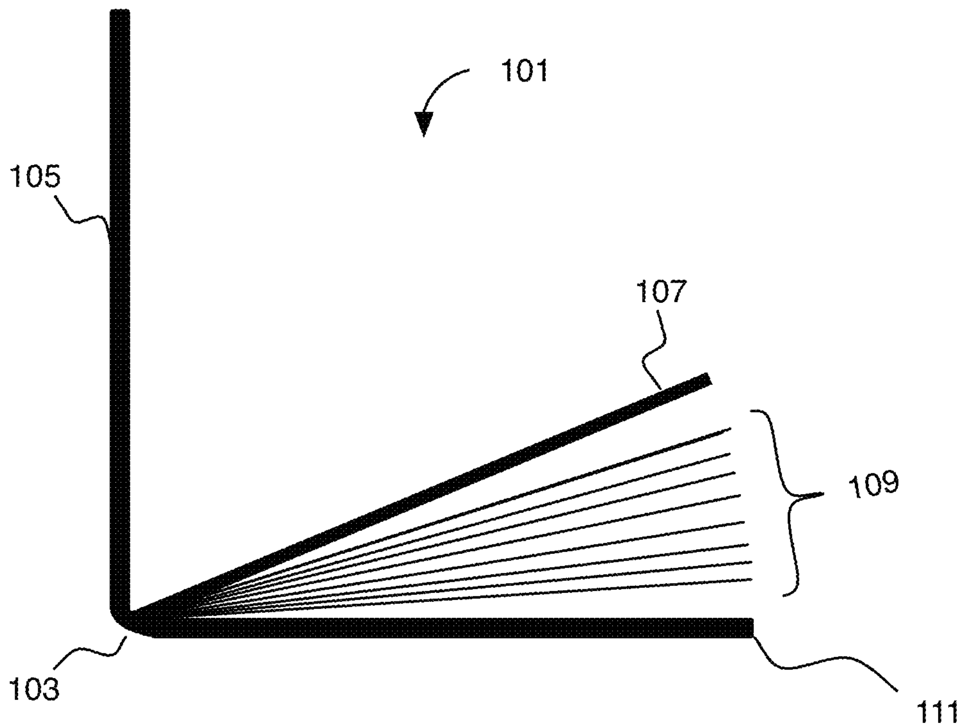
FIG. 2 is a cross-section illustration of the multi-page security document of FIG. 1.

FIG. 2 is a cross-section illustration of the multi-page security document 101 along the line a-a of FIG. 1 and showing a number of sheets 109 between the second sheet 107 and the back cover 111.

Figure 3:
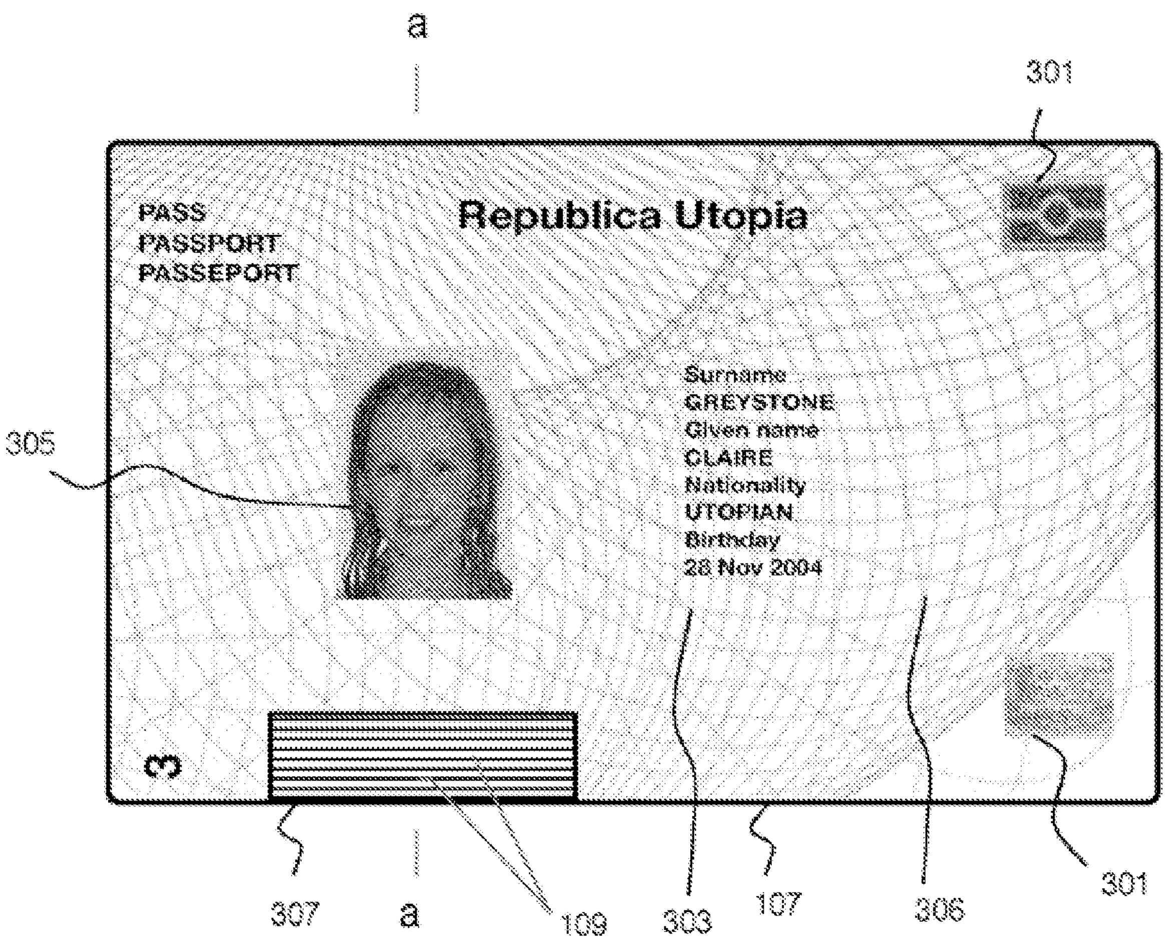
FIG. 3 is a plan view of the second sheet of the multi-page security document of FIG. 1.

FIG. 3 is a plan view of the second sheet 107—in this example a data sheet of a passport—of a multipage security document 101. The second sheet 107 contains a number of security features 301 as well as personalization data such as biographical information 303, a photograph 305, and a guilloche pattern 306, which is typically a multi-colored offset print.

The multi-page security document 101 further includes a special personalization section 307 that is composed of a an area along the edge of a sequence of sheets 109. This edge area may either be a portion of the edge—as illustrated in FIG. 3—or it can be the entire edge. The special personalization section 307 is made up of edge areas of a sequence of the sheets 109 of FIGS. 1 and 2 such that for any two sequential sheets a portion of the lower sheet is exposed beyond the corresponding edge of the upper sheet.

Figure 16:
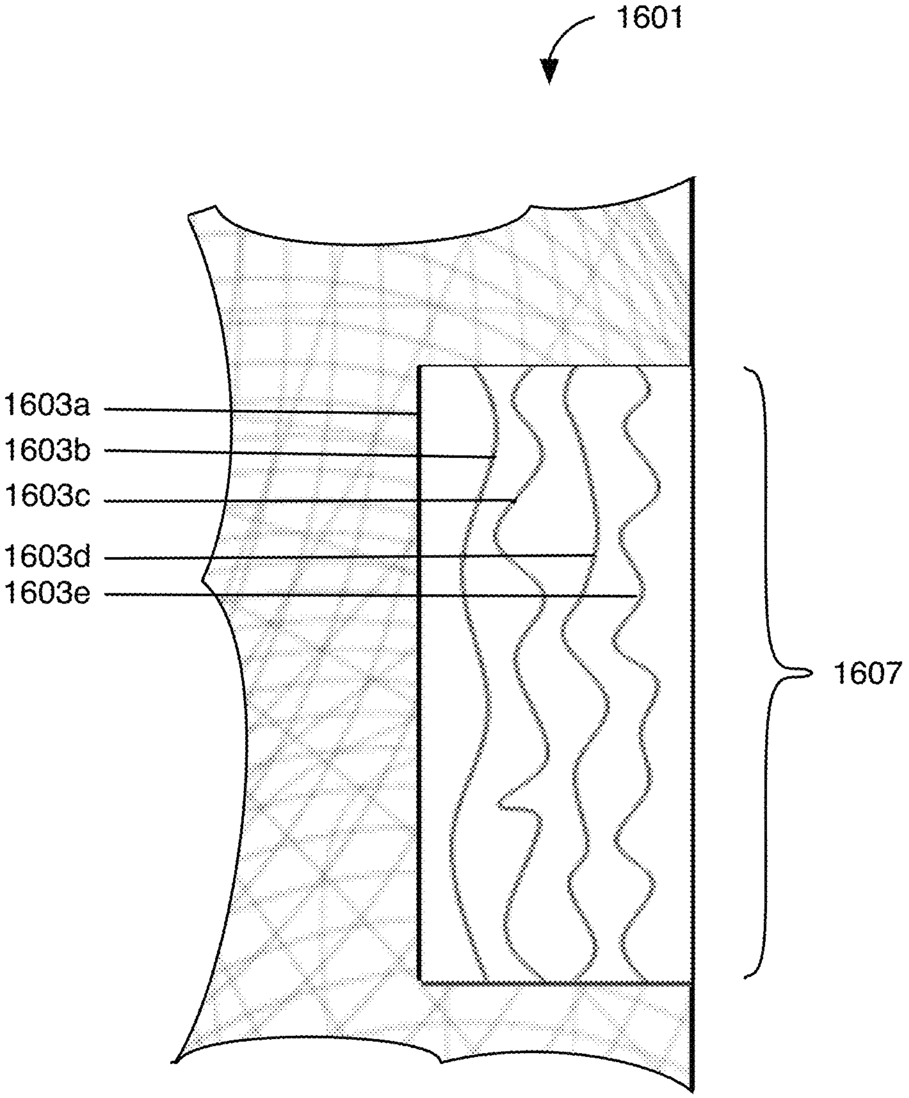
FIG. 16 is a plan view of a multi-page security document in which the shapes of the cutout pieces are irregular.

In one embodiment, the special personalization section 307 is created by cutting out a piece of each sheet such that for each two sequential sheets the upper sheet is cut a little bit more than the lower sheet thereby revealing a portion of the lower sheet below the upper sheet. While the example special personalization section 307 illustrated in FIG. 3 is a rectangle in which the cutouts in respective sheets 109 of the multi-page security document have very similar, albeit different sized, cutouts, in alternative embodiments the shape of the cutouts may vary from sheet to sheet as is illustrated in FIG. 16 and discussed in conjunction therewith hereinbelow.

Figure 4:
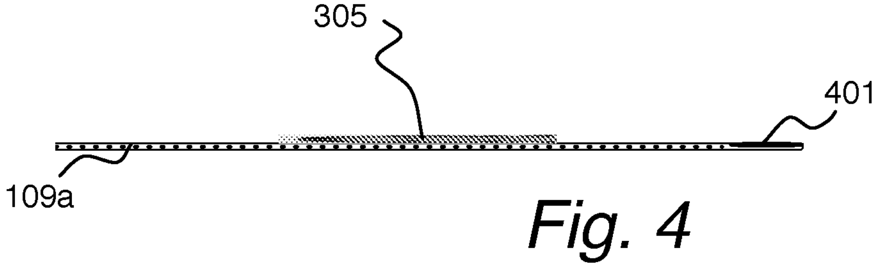
FIG. 4 is a cross-section illustration of an embodiment of an internal sheet of FIGS. 1 through 3.

FIG. 4 is a cross-section illustration of an embodiment of an internal sheet 109 of FIGS. 1 through 3 (albeit obscured in FIG. 3 by the data sheet 107). In the embodiment of FIG. 4, an interior sheet 109*a* has a personalization area 401, on which ink has been applied. The ink may be offset-printed ink or a material that undergoes a color change when exposed to a specific laser, for example, inkjet ink, acrylic paint, organic dyes, photochromics dyes or any other material deposited in a layer over the support page (or mixed inside such a page) and that undergoes a color change when exposed to a specific laser. There are many materials that react to different laser wave length and type (e.g., nanosecond laser, picosecond laser, femtosecond laser). For example:

- inks that contains metallic particles can be removed by infrared laser (1064 nm). Such particle removal may provide a change of color
- the inks corresponding to primary colors in most printing processes are reactive to UV laser in that the UV laser bleaches such colors as illustrated below in Table 1:
- Some magenta inks bleach with low power UV laser
- Some cyan inks bleach at a higher power UV laser than the laser used for bleaching magenta
- Some yellow inks bleach using high power UV laser
- With combination of above, UV lasers can generate different color change from grey (grey being the result of a yellow, cyan, and magenta pigments) to green, to yellow, and to white depending the power used.

Figure 5:
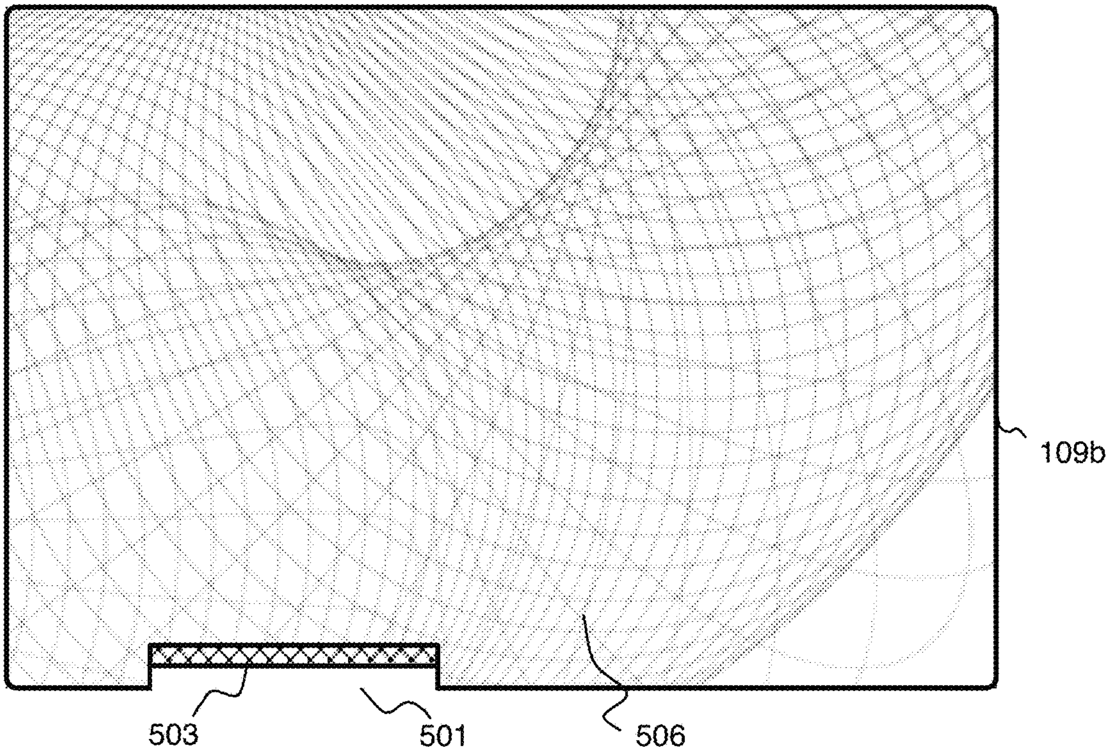
FIG. 5 is a plan view of one internal sheet of the multi-page security document of FIGS. 1 through 4.

FIG. 5 is a plan view of one internal sheet 109*b*, corresponding one of the sheets 109 of FIGS. 1 through 4, according to one embodiment. The sheet 109*b* has a cutout 501, which would reveal a portion of sheets lower to it in the sequence of sheets.

Further, the sheet 109*b* includes a personalization area 503 that in turn is revealed through corresponding cutout of sheets above it in the sequence of sheets that make up the multi-page security document 101. As discussed hereinabove, the personalization area 503 may be inked with a laser-alterable ink. Alternatively, the lines that make up the guilloche 506 of the lower sheet(s) is exposed through the cutout 501 wherein the guilloche 506 is printed with a laser-alterable ink.

Figure 6:
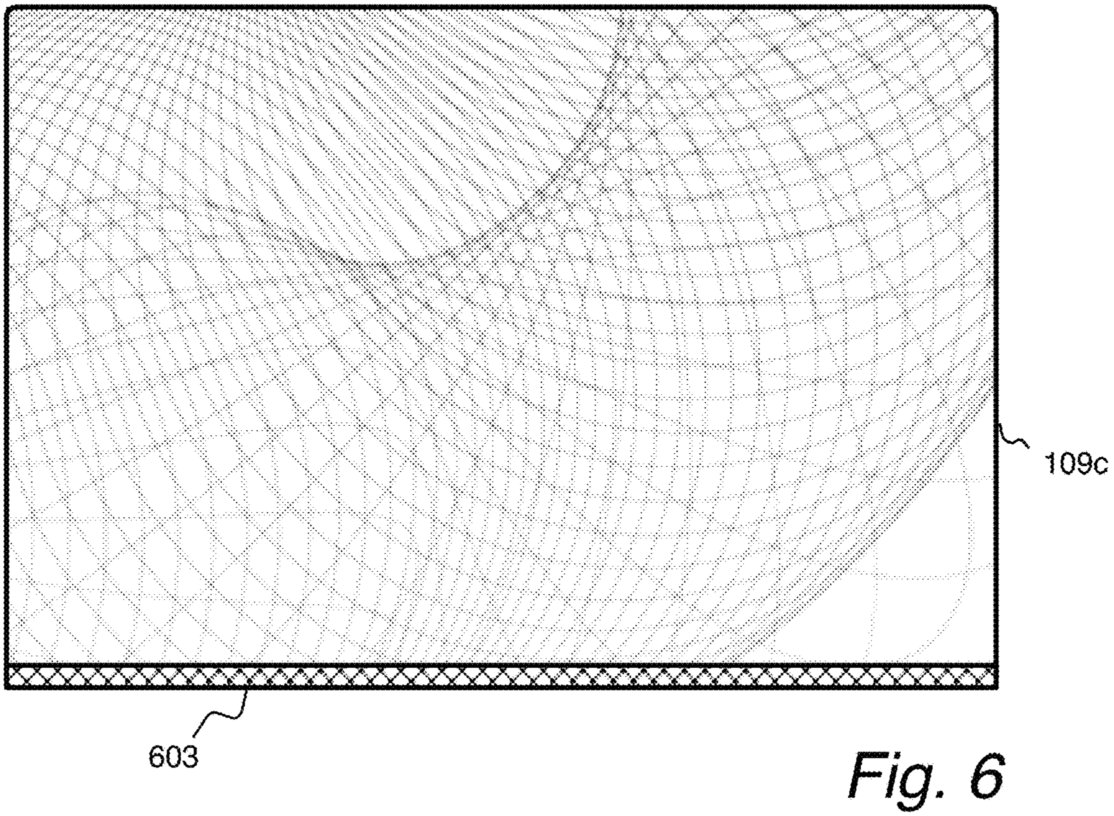
FIG. 6 an alternative plan view of one internal sheet of the multi-page security document of FIGS. 1 through 4.

In an alternative embodiment illustrated in FIG. 6, which illustrates one sheet 109*c* of a security document. The sheet 109*c* has a personalization area 603 that extends over the entire edge of sheet 109*c*.

Figure 7:
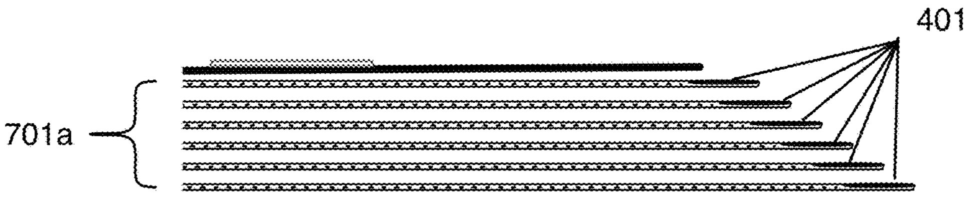
FIGS. 7 through 10 are cross-section views of several pages of the multi-page security document of FIGS. 1 through 6 according to different embodiments.
Figure 8:
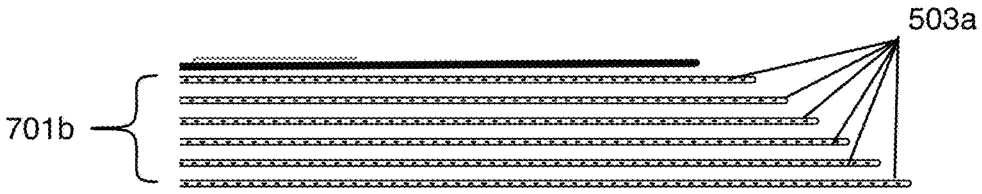

FIGS. 7 and 8 are cross-section views along the line a-a of FIG. 3. In FIG. 7, a sequence 701*a* of sheets with a staggered edge having an inked area at the edge is formed by cutout portions as illustrated in FIG. 5. In FIG. 8, the example is also formed using a cutout portion as illustrated in FIG. 5. However, in FIG. 8, the revealed portions reveal the offset-printed lines that make up the guilloche 506 of FIG. 5.

Figure 9:
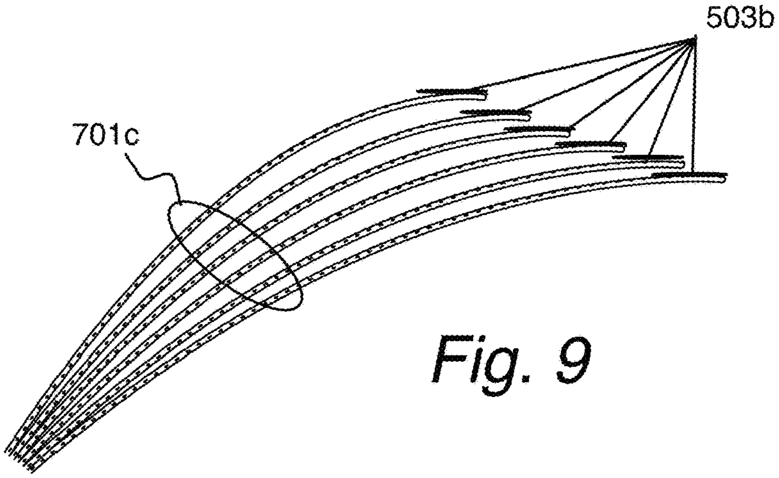
Figure 10:
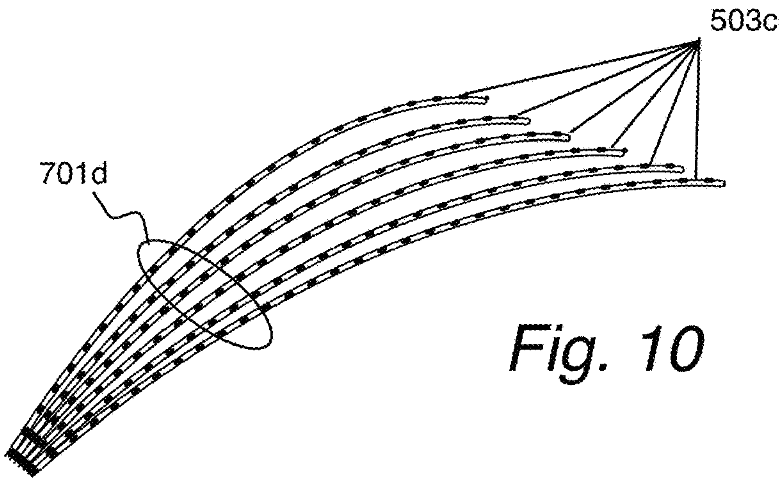

FIGS. 9 and 10 are cross-section views of alternative multi-page security documents in which the personalization areas 503*b* and 503*c*, respectively, are revealed by bending the sequences of sheets 701*c* and 701*d*, respectively. In the former case, the revealed area is inked, and, in the latter, the revealed area is a reveal of the lines that make up the guilloche pattern.

Figure 11:
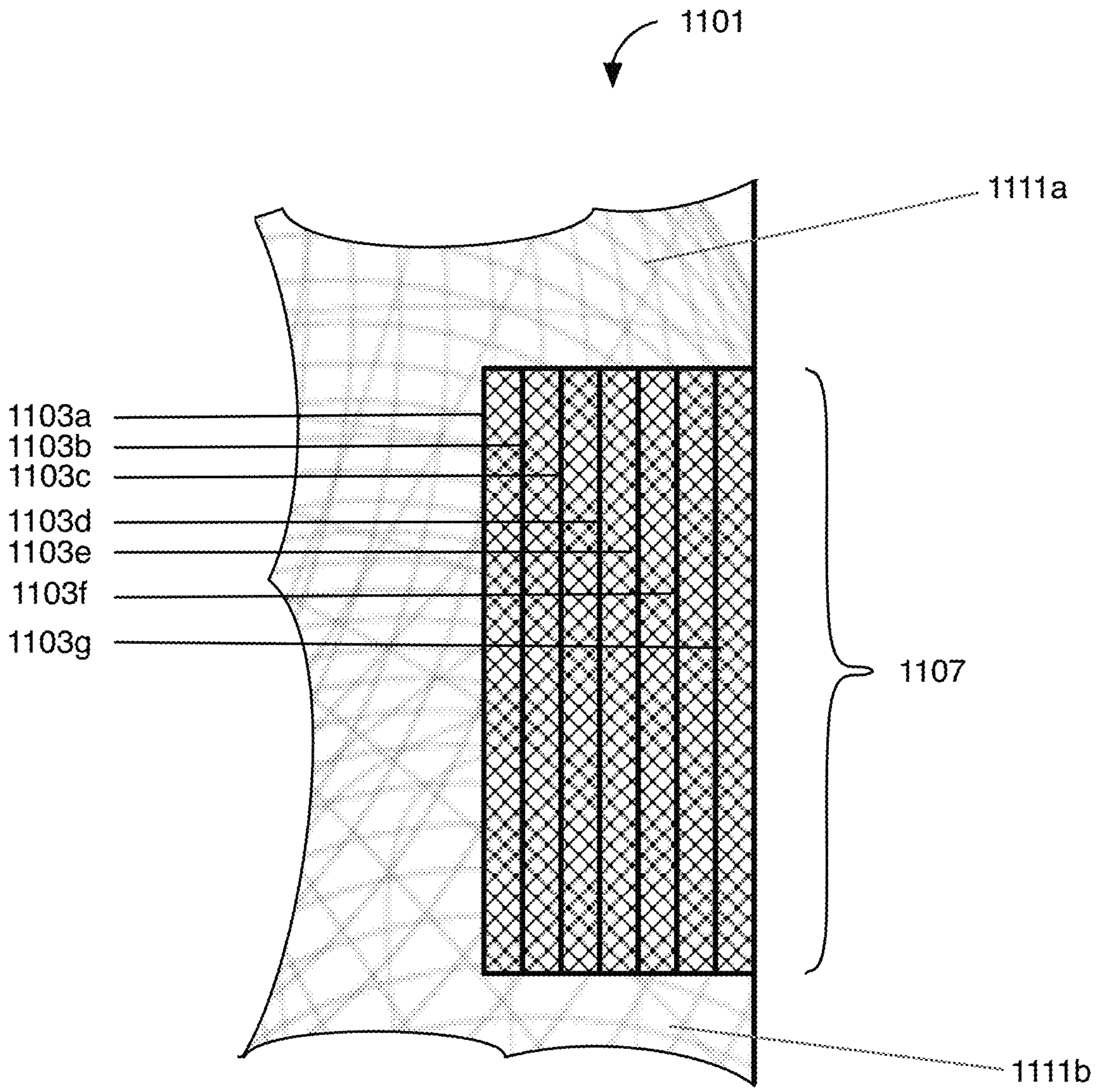
FIG. 11 is a plan view of a portion of a data sheet of a multi-page security document revealing a special multi-page personalization section composed of a plurality of revealed personalization areas on a sequence of internal pages of the multi-page security document.

FIG. 11 is a plan view of a portion of a data sheet 1101 (corresponding to data sheet 107 of FIGS. 1 through 3) revealing a special personalization section 1107 (corresponding to the special personalization section 307 of FIG. 3) composed of a plurality of revealed personalization areas 1103*a* through 1103*g* (corresponding to the personalization portion 503 of FIG. 5) located on interior sheets 109, respectively. The special personalization section may be revealed under the data sheet 1101 by providing a cutout in the data sheet 1101 (as illustrated in FIG. 11) or by providing a transparent window in the data sheet 1101. As discussed hereinabove, the special personalization areas 1103 may extend over any portion of the edge of the pages that make up the security document, for example, the entire edge, in which case the portions 1111*a* and 1111*b* adjacent to the cutout section would not be present.

Figure 12:
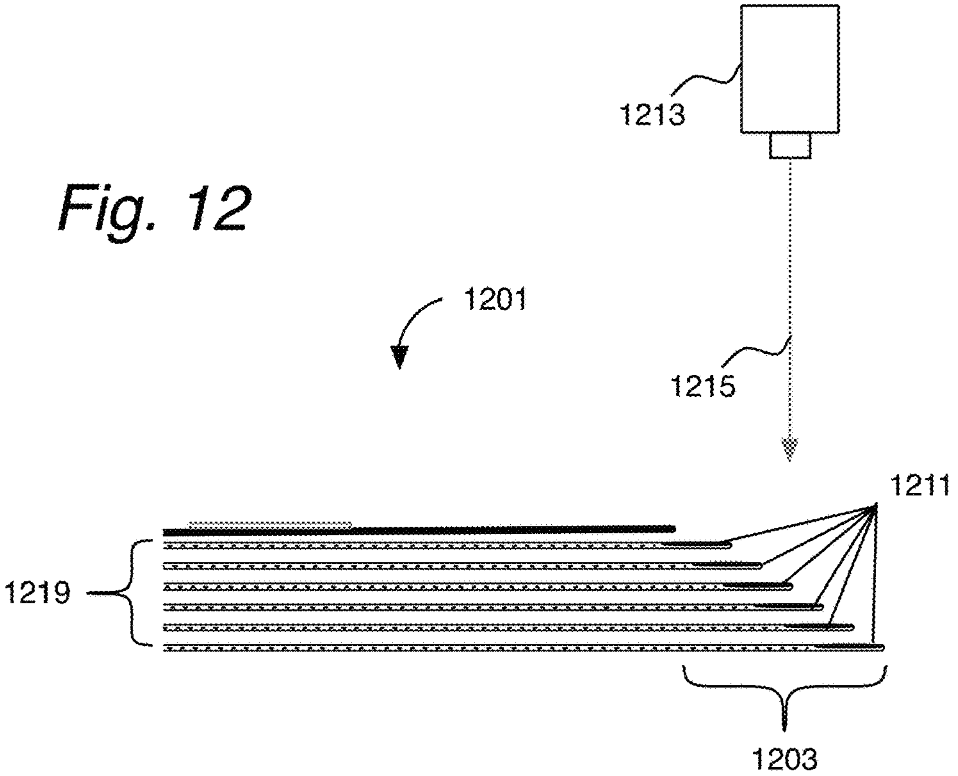
FIGS. 12 and 13 are schematic illustrations of mechanisms for marking the special personalization section of a multi-page security document.

FIG. 12 is a schematic illustration of a mechanism for marking the special personalization portion 1203 on a multi-page security document 1201 wherein the personalization area of each individual sheet 1209 has an inked marking portion 1211.

A multi-color laser 1213 capable of radiating a controlled laser beam 1215 is used to mark the personalization sections 1211 of each of several sheets in a sequence of sheets 1219.

The multi-color laser 1213 is, for example, a galvanometer mirror laser, which has a galvanometer positioning system that accurately controls the direction of the produced laser beam. In a first embodiment, the laser 1213 is a multi-color laser such as the EKSPLA NT242 from UAB Ekspla of Vilnius, Lithuania or different lasers that produce different wavelength laserbeams, e.g., laser IR –1064, Red Laser –671 nm, Green Laser 532 nm, Blue Laser 471 nm from either Xiton Photonics GmbH of Kaiserslautern, Germany or TRUMPF GmbH of Ditzingen, Germany. In an embodiment, the multi-color laser 1213 may produce laser beams in, at least, the colors as indicated in Table 1 with the associated pulse duration:

TABLE 1

| Example Lasers | | | | |
|---|---|---|---|---|
| Color | Wavelength | Wattage | Frequency | Pulse duration |
| IR | 1064 nm | 10 W | 100 Khz | 20 ns |
| Red | 671 nm | 1.2 W | 90 Khz | 25 ns |
| Green | 532 nm | 7 W | 95 Khz | 20 ns |
| Blue | 447 nm | 2.5 W | 50 Khz | 20 ns |

The resulting color of the marking depends on the color of the ink, the ink material, on inked marking portion and the color of the laser pulse. Table 2 below provides examples of colors produced by laser wavelength and effect on the ink or other material in the special personalization area.

TABLE 2

| Example Lasers effects | | |
|---|---|---|
| Color | Wavelength | Effect |
| IR | 1064 nm | Carbonize the material or change color of thermochromic ink |
| Red | 671 nm | Bleach mainly cyan pigment, which make a red color mark on YMC (yellow-magenta-cyan) ink |
| Green | 532 nm | Bleach mainly Magenta pigment, which make a green color on YMC Ink |
| Blue | 447 nm | Bleach mainly yellow pigment, which make blue color on YMC ink |
| UV | 355 nm | Bleach all the pigment, which make lighter color |

Lasers of different wavelengths have different specific effects, e.g., a particular wavelength laser could bleach only one pigment type, which could be a component of two or more different pigments included in a specific proportion in the ink composition of the personalization area 503

Alternatively, the laser is used to bleach the ink. Given original ink marking in cyan, magenta, and yellow pigment (note actual color is produced by combination of these pigments), a red laser bleaches cyan pigment, green laser bleaches yellow pigment, and blue laser bleaches yellow pigment. Alternatively, the ink may contain additives that carbonize when exposed to laser.

Alternatively, the laser is used to change the color of the ink (or paper) by thermal effect, e.g., IR laser over thermal ink (or paper) that could be reveled in different color, e.g., thermochromic ink such as those from Olikrom SAS of Pessac, France.

Figure 13:
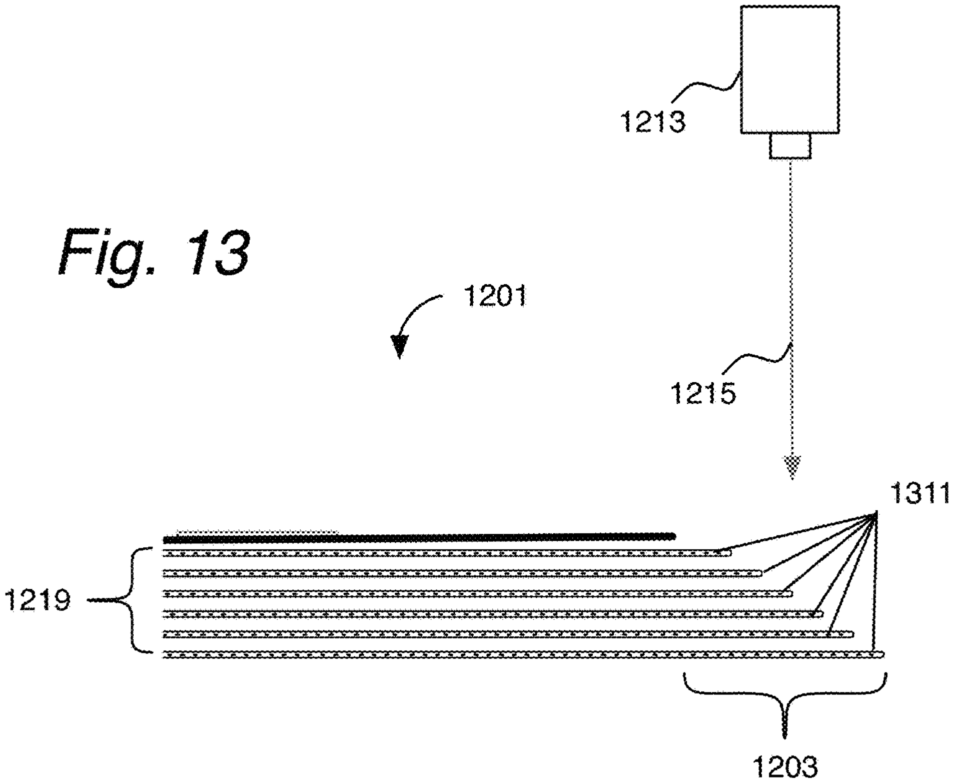

Alternatively, illustrated in FIG. 13, marking is performed by radiating the laser beam 1215 onto marking portions 1311 that are the lines that make up guilloches 506.

Figure 14:
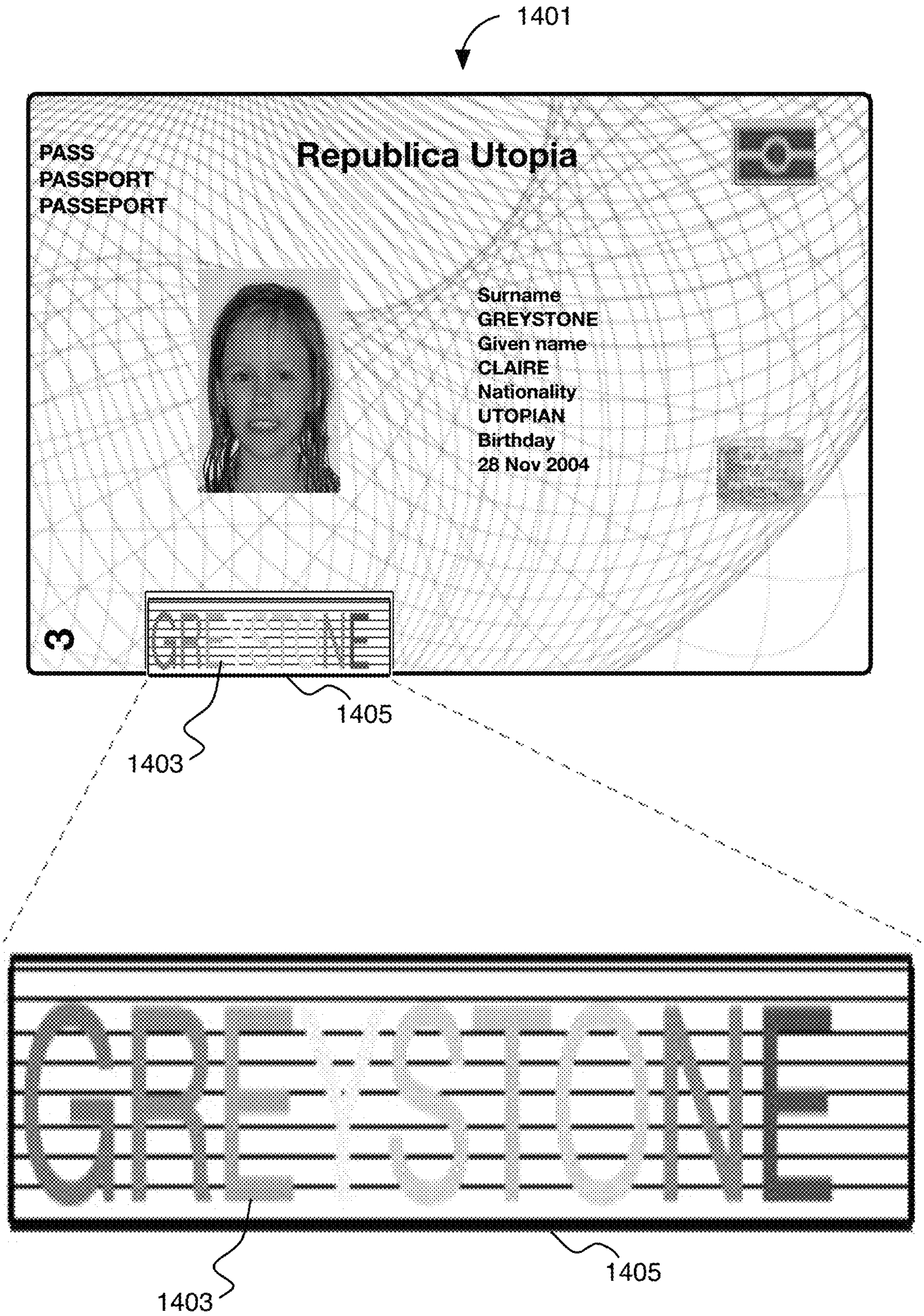
FIG. 14 is an illustration of a multi-page security document marked with a rainbow text in a special multi-page personalization section.

FIG. 14 is an illustration of a multi-page security document 1401 marked with a rainbow text 1403 in a special multi-page personalization area 1405 (corresponding to special personalization area 307 of FIG. 3) in the manner described hereinabove.

The hereinabove technique provides a security feature against attacks on a multi-page security document. For example, in a passport document, the sheets 109 are often used to print visas. By removing a sheet from one passport and inserting it into another, a counterfeiter may in an unauthorized manner transfer the visa to a passport of a person not entitled to the rights conveyed by the visa. However, unless the rainbow marking in the multi-page special personalization area is identical, the rainbow personalization in the multi-page special personalization area would not appear as a consistent marking.

In an embodiment, the rainbow personalization in the multi-page special personalization area is a specific data related to a particular multi-page security document. For example, in the case where the multi-page security document is a passport, the rainbow text may be the passport number and the family name of the passport holder.

Figure 15:
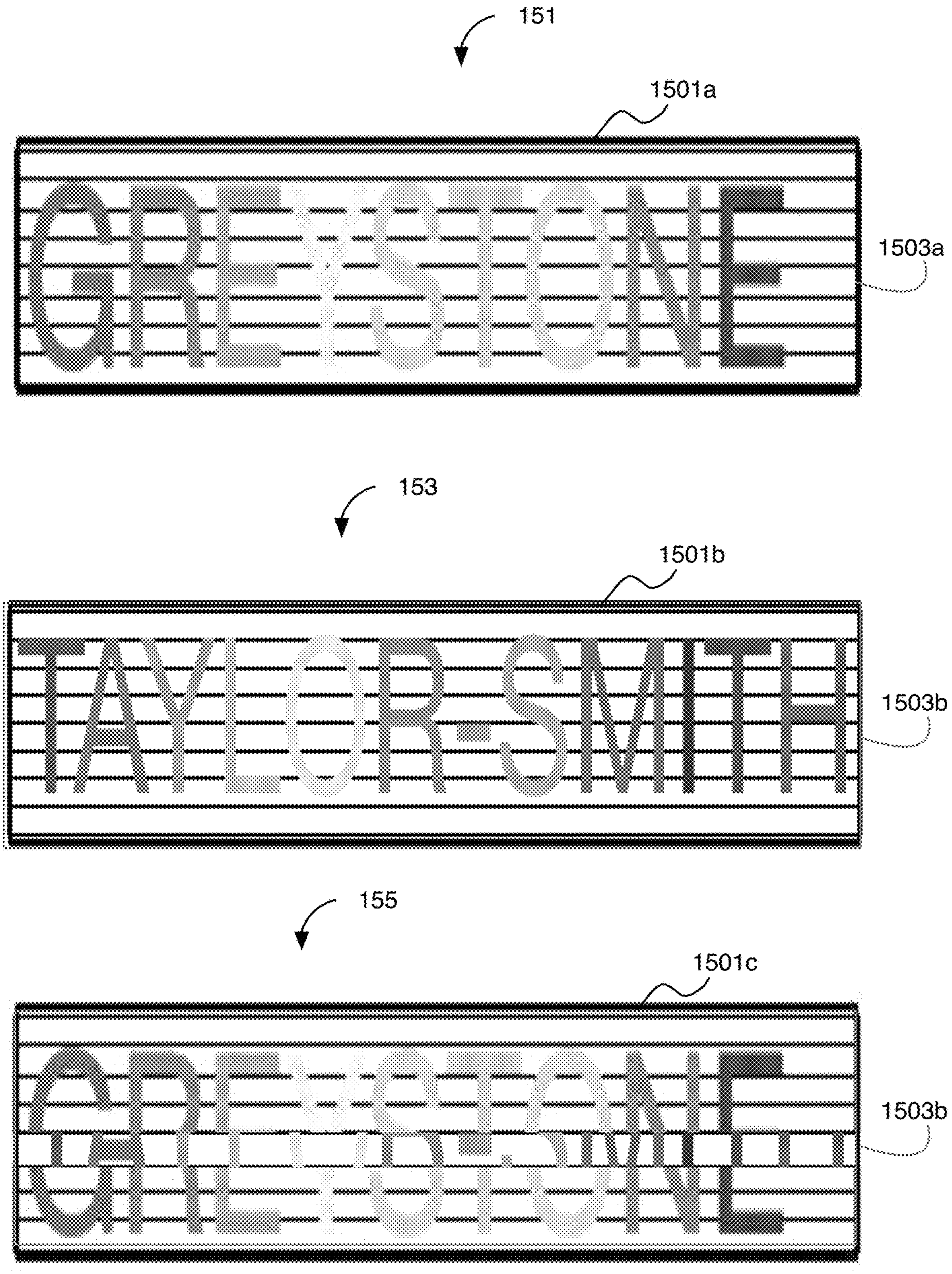
FIG. 15 is a schematic illustrating that swapping pages marked with a multi-page rainbow text may reveal a counterfeit created by page swapping.

Consider, for example, the markings in FIG. 15 illustrating the rainbow text entered into a special personalization section 1501*a* of a first passport book 151 and a special personalization section 1501*b* of a second passport book 153, each marked with the names of the respective passport holders. In the third passport book 155, a sheet 1503*b* from the second passport book 153, belonging to an individual named Taylor-Smith, has been inserted into the first passport book 151, belonging to an individual named Greystone, thereby replacing the corresponding sheet 1503*a* therein and appearing in the special personalization section 1501*a* of the first passport book 151. The rainbow text in the special personalization area 1501*c* in the resulting passport book 155 is clearly not internally consistent in that rainbow text of sheet 1503*b* does not match up with the rainbow text of the sheets above and below it. Therefore, a person examining the resulting passport book with the special personalization section 1501*c* of the resulting passport book 155 would be able to see the inconsistency and flag the passport book as a potential counterfeit.

While the special personalization area described hereinabove is illustrated as a regular rectangular section, in alternative embodiments, the cutouts (regardless of whether for a portion of an edge or over an entire edge) may have irregular shapes and vary from sheet-to-sheet. An example multi-page security document 1601 of such an embodiment is illustrated in FIG. 16. As with examples described hereinabove, the multi-page security document 1601 contains a special personalization section 1607 that is, in the embodiment of FIG. 16, made up of irregularly shaped special personalization areas on sheets 1603*a* through 1603*e*. The shape maybe random or follow some variable pattern, e.g., sinusoidal with varying frequency or multiple frequencies and amplitudes. In a preferred embodiment, the entire special personalization area of an underlying sheet is visible in the cutout from the next higher-up sheet. A rainbow text, e.g., in the style of FIG. 15, printed over the special personalization section 1607 makes substitution of a sheet from one document (source) to another document (target) easily discernable as the rainbow text of the source document as well as the shape of the personalization area do not match. Furthermore, there is also a mismatch in the revealed rainbow text on the page of the target document immediately below the swapped-in page from the source document.

Figure 17:
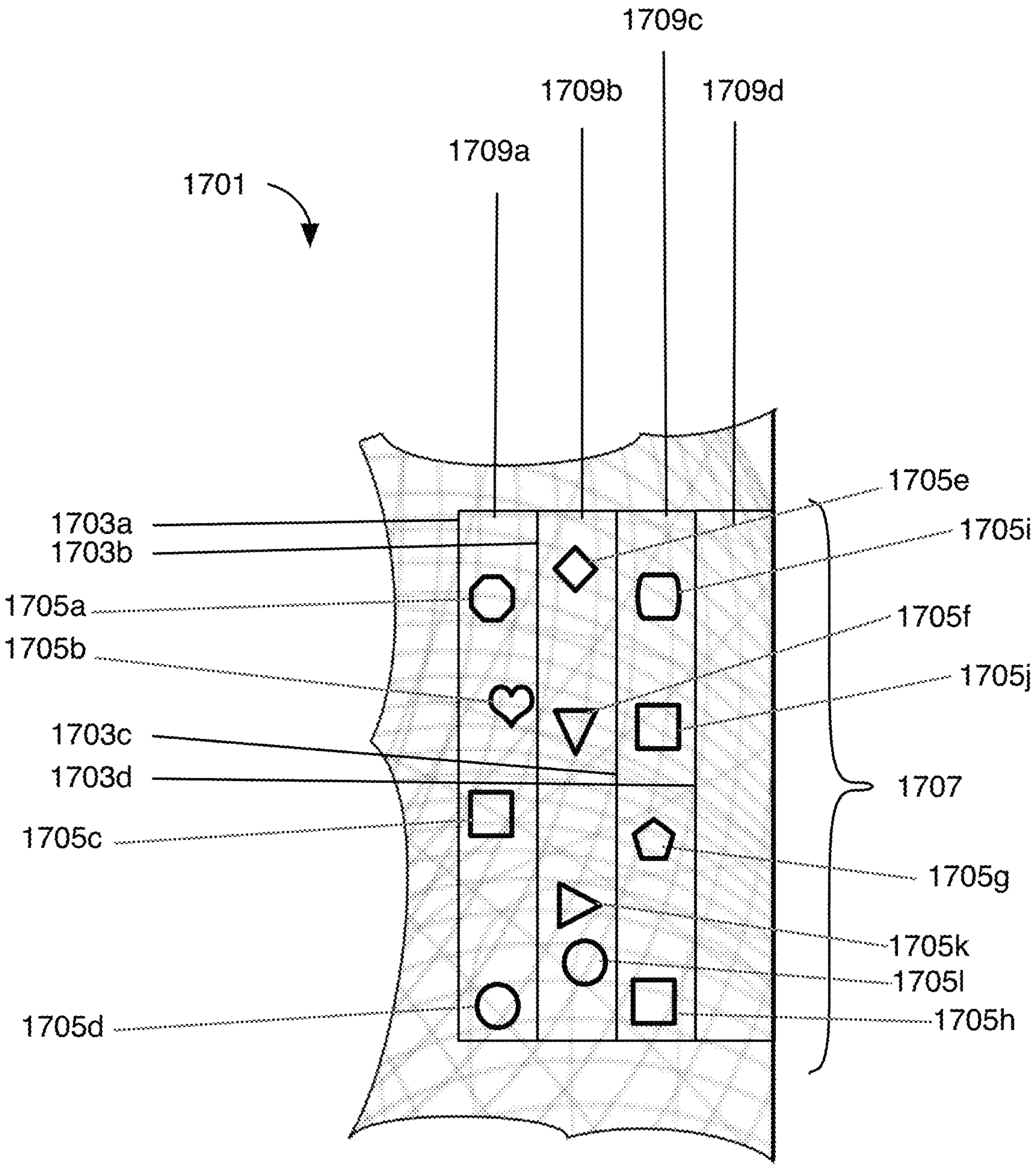
FIGS. 17 through 24 illustrate an embodiment in which a special personalization section contains internal cut outs that provide windows to an underlying page.

In a further embodiment, the special personalization areas include cutouts that provide windows to special personalization areas of other sheets. FIG. 17 is an illustration of a section 1701 of a multi-page security document according to this embodiment. Special personalization areas 1703*a* through 1703*d* include internal cutouts 1705*a* through 17051, which may have a variety of shapes, e.g., triangles, octagons, hearts, circles thereby providing a special multi-page personalization section 1707. Each of the cutouts 1705 is a window open to a special personalization area 1703 on the sheet below it, e.g., the cutouts 1705*a* through 1705*d* are cutouts in the special personalization area 1703*a* of the uppermost internal sheet 1709*a* that provide windows to the special personalization area 1703*b* second uppermost internal sheet 1709*b*.

The edge-personalization as described above is performed across the cutouts 1705. Consider, for example, the special personalization area 1703*a*, in the example of FIG. 17 it has been personalized using a laser that turns the original pigmentation into a color symbolized herein with a southwest-to-northeast striping.

Figure 18:
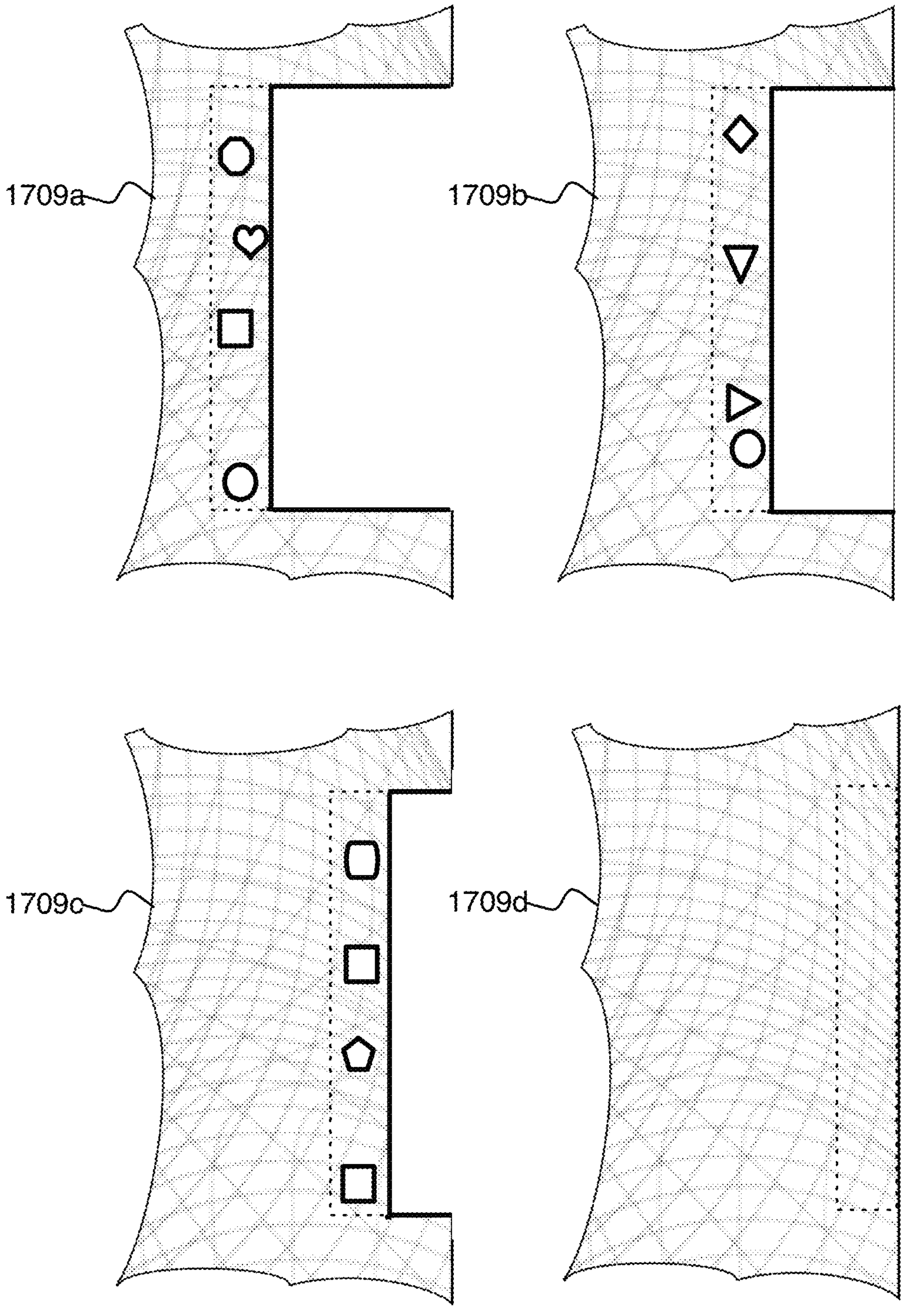

FIG. 18 illustrates the sheets 1709*a* through 1709*d* in isolation from one another.

Figure 19:
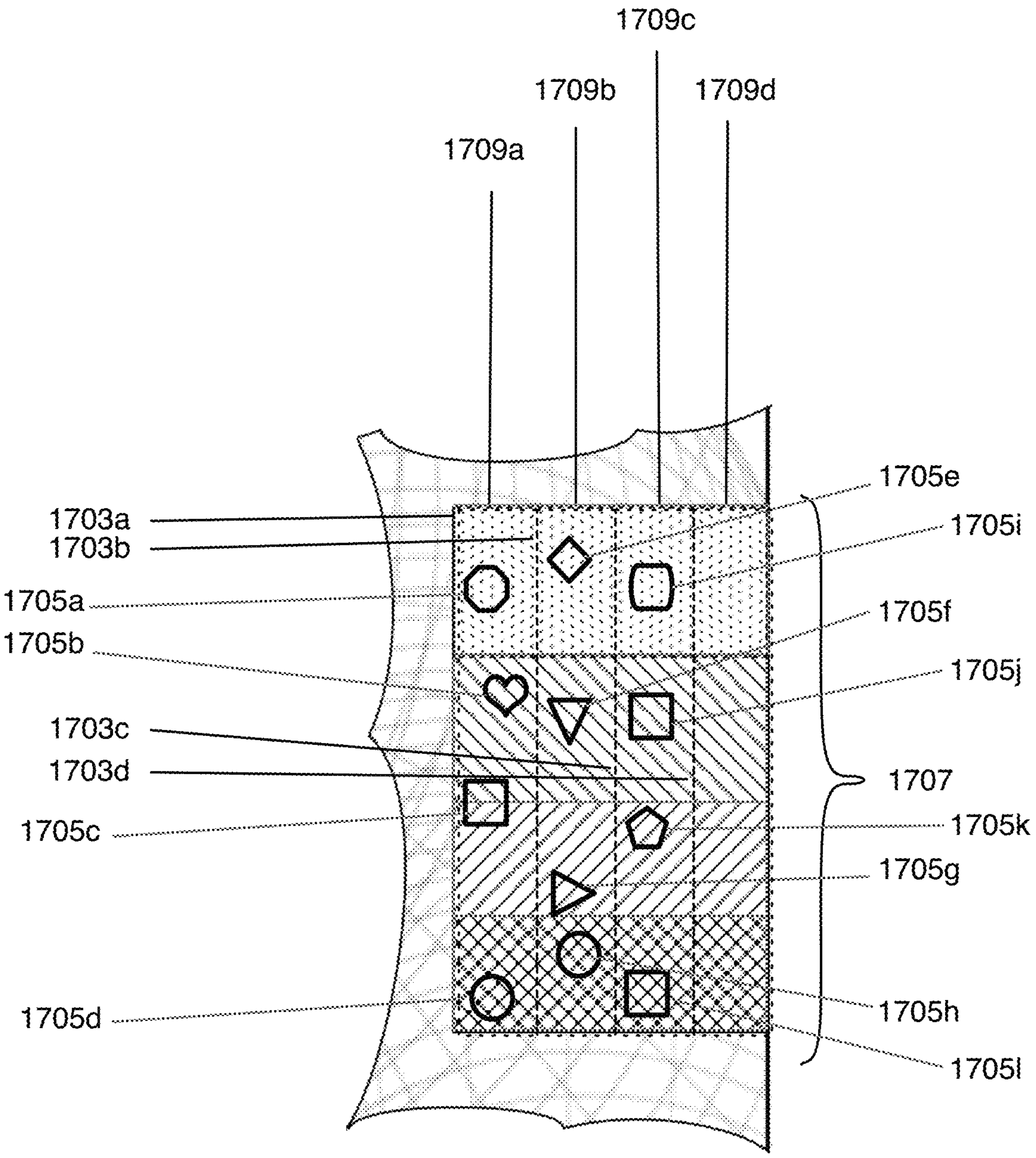

FIG. 19 illustrates the special personalization section 1707 personalized. While in a preferred embodiment, a rainbow text in the manner of FIG. 15 is laser-printed over the special personalization section 1707, for illustrative purposes, in FIG. 19, four different "colors" are printed as horizontal bands across the special personalization section 1707. These "colors" are represented by four different hatch patterns, i.e., the uppermost horizontal band is hatched with a dotted pattern, the next band, with a northwest-to-southeast diagonal hatch, the third band is a southwest-to-northeast diagonal hatch, and finally, the fourth band is a diagonal crosshatch.

Figure 20:
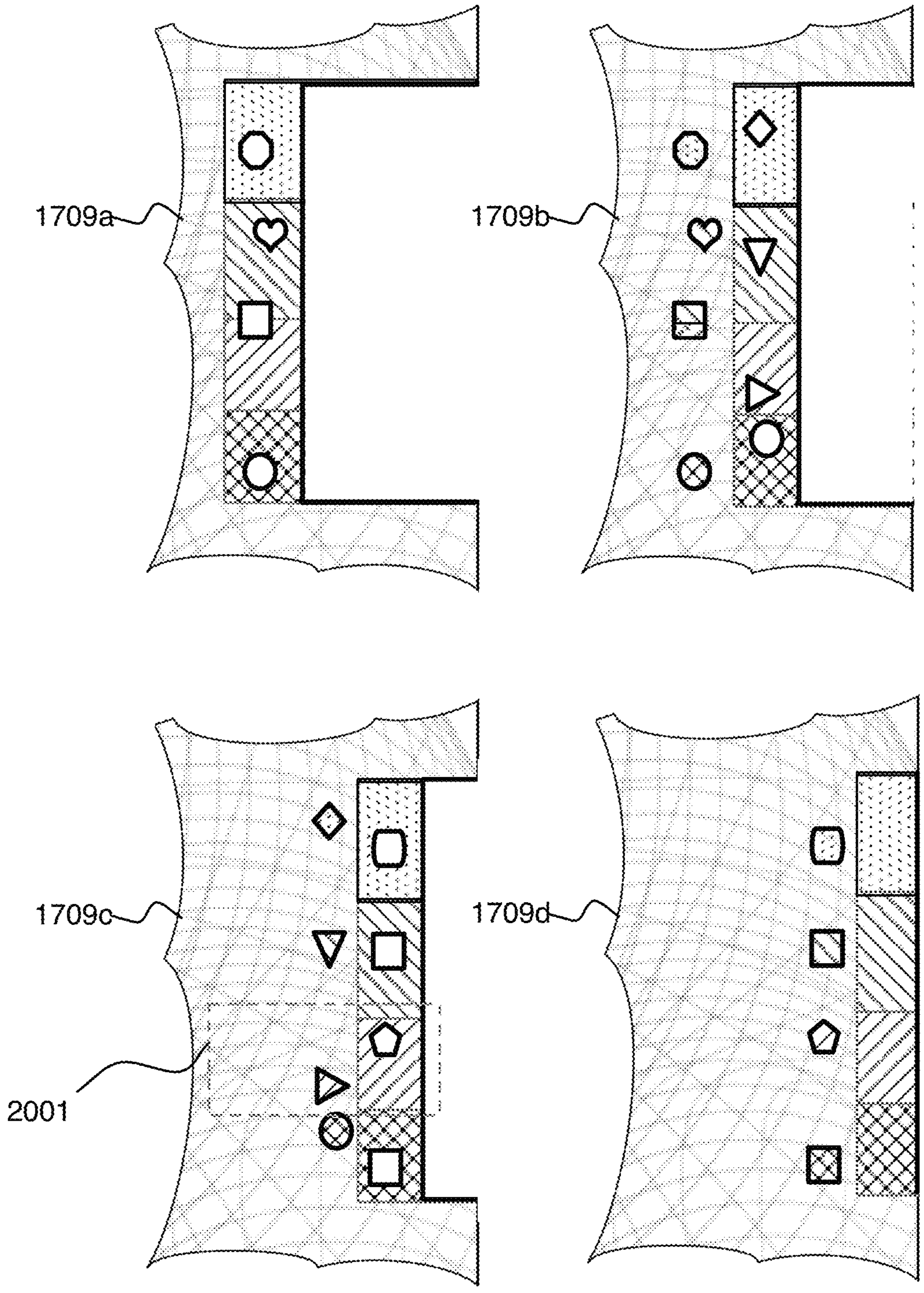

Consider the third horizontal band, which is marked with a southwest-to-northeast diagonal hatch. Each of the sheets 1709*a* through 1709*c* have cutouts, i.e., the cutouts 1705*c*, 1705*k*, and 1705*g*. Therefore, the sheets underneath these sheets are all marked with the same pattern in the area exposed by the crosshatches. FIG. 20 illustrates the markings for each of the sheets 1709*a* through 1709*d* in isolation after the personalization of FIG. 19.

Figure 21:
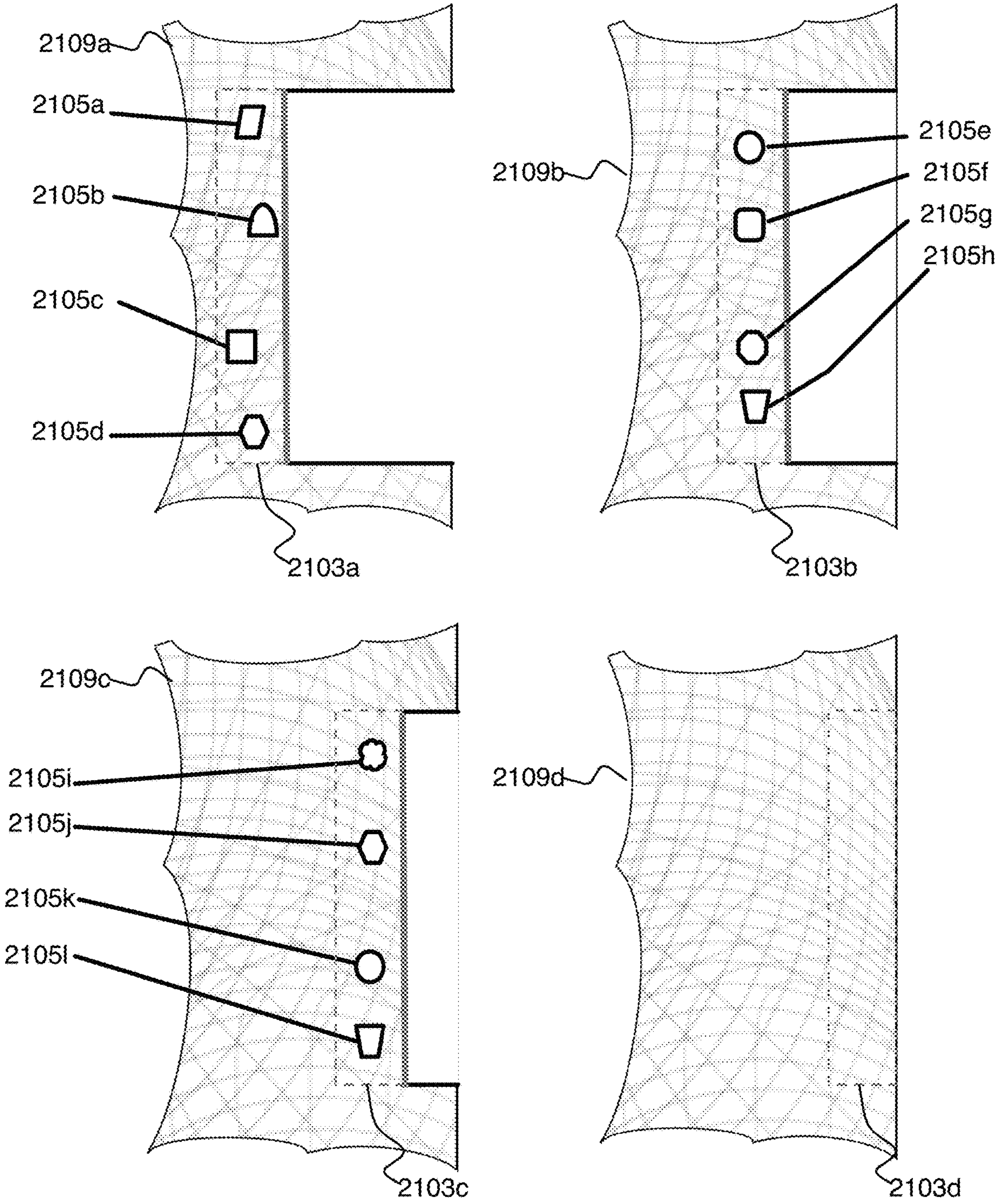

FIG. 21 illustrates pages of a second document that has cutout windows 2105*a* through 2105*i* in the special personalization areas 2103*a* through 2103*d* that make up the special multi-page personalization section for the second document. The cutout windows 2105*a* through 2105*i* are different in location and style from the cutout windows of the document 1701 of FIGS. 17 through 20.

Figure 22:
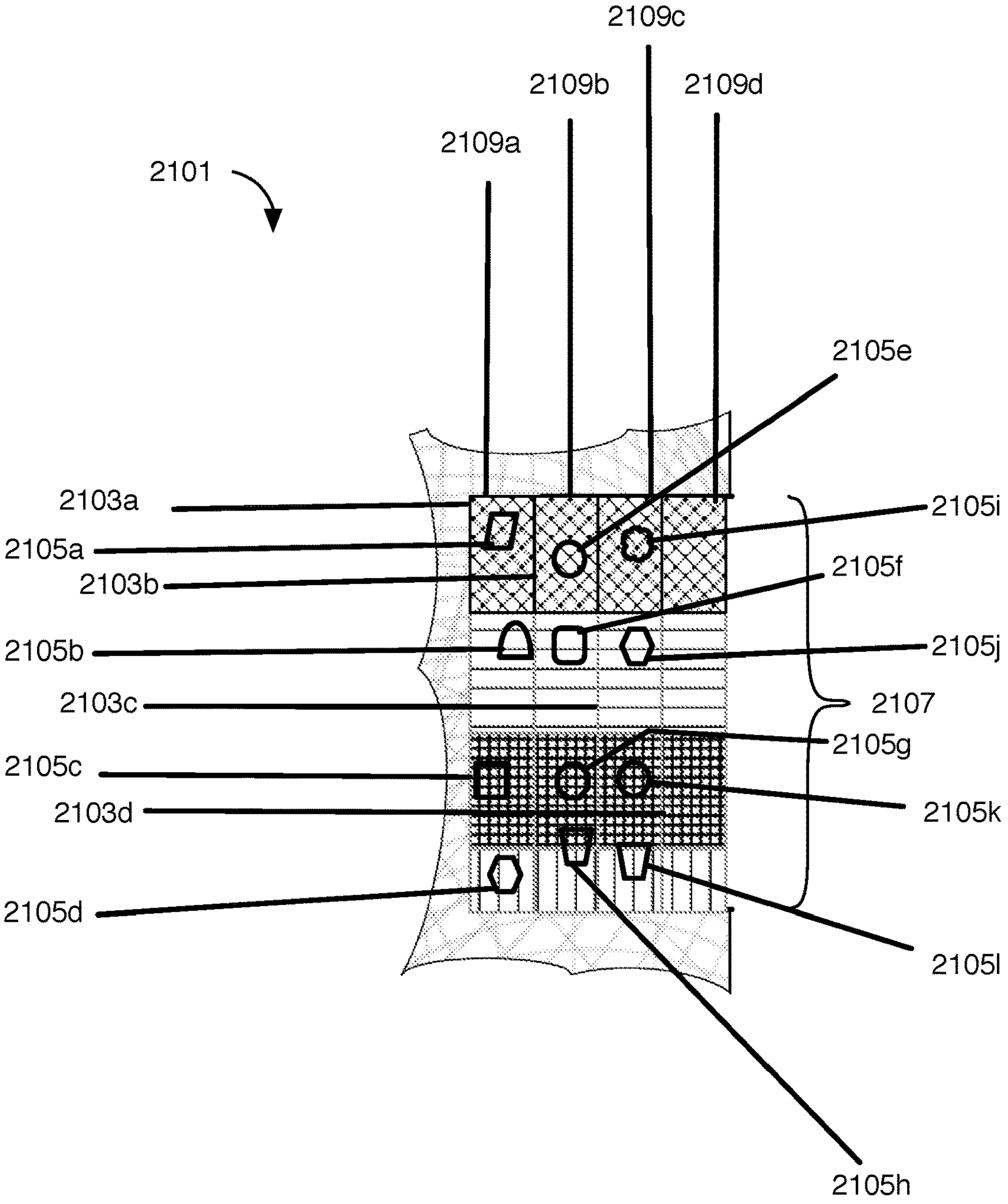

FIG. 22 provides an illustration of the second document 2101 having been personalized. The personalization may be rainbow text in the manner set forth in FIG. 15. However, for illustrative purposes, as with the example of FIGS. 19 and 20, the personalization is illustrated as four horizontal "color" bands, each having its own hatch marking. As with the example of FIGS. 19 and 20, the marking of a page causes corresponding marking in the area in the underlying-page corresponding to a see-through window in the page being marked. "Corresponding marking" means that a pattern in the personalization, e.g., a rainbow marking including a name or document number contains a portion that is located on the underlying page such that the portion of the personalization pattern produced by the laser onto the lower page fits as a puzzle piece in with the pattern on the upper page having the see-through window.

Thus, with respect to the document of FIGS. 17 through 20, the document 2101 has been personalized with different colors as indicated with different hatch marking from the hatch markings used on document 1701.

Figure 23:
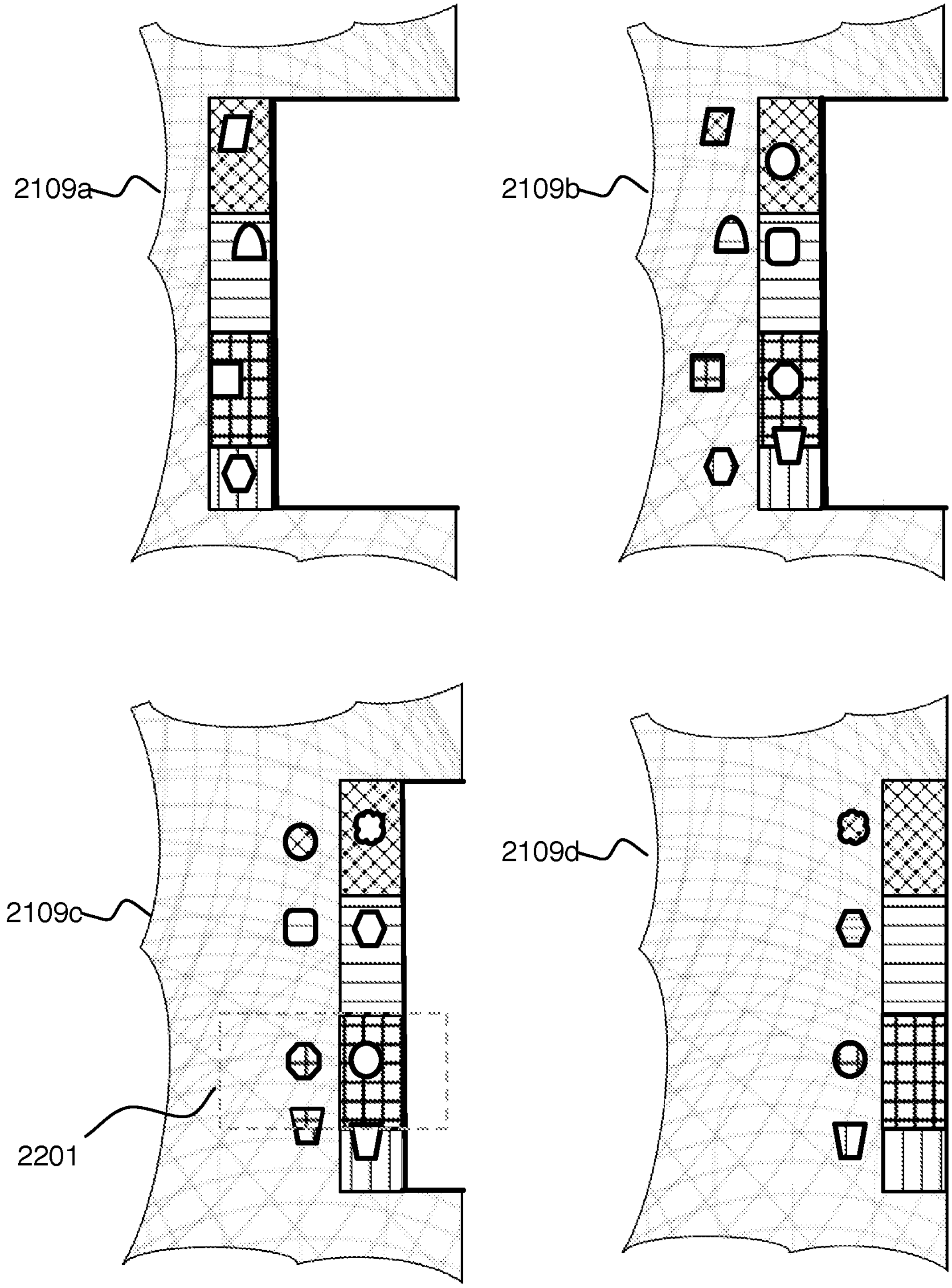

FIG. 23 illustrates these hatch markings on the pages 2109*a* through 2109*d* in isolation from one another.

Figure 24:
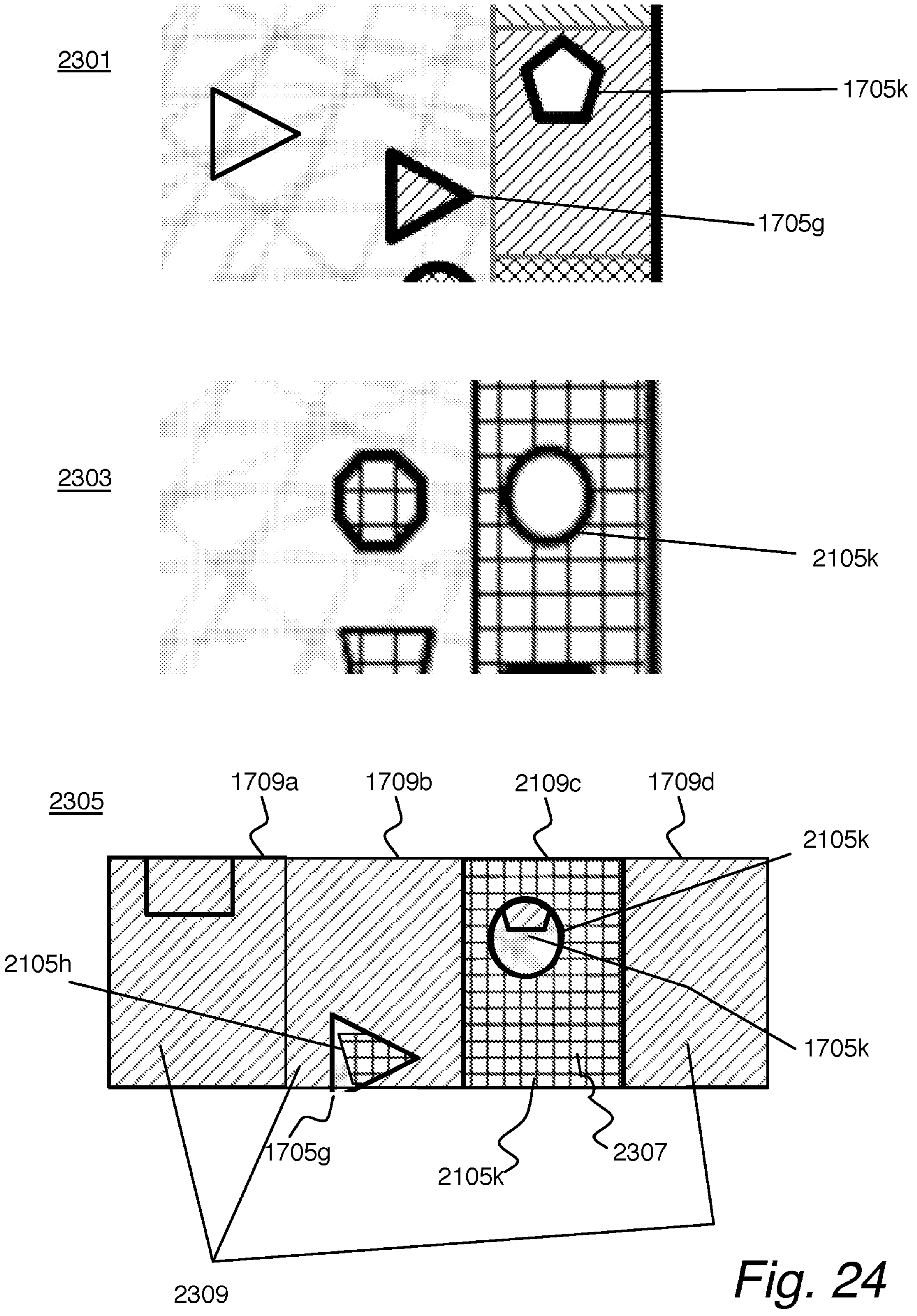

FIG. 24 illustrates the effect of substituting a sheet, specifically the third sheet 2109*c* from the second document 2101, for a sheet in the first document 1701, specifically the third sheet 1709*c*. The first image 2301 provides a magnification of the dashed area 2001 of the personalized sheet 1709*c* of FIG. 20. The second image 2303 provides the corresponding area 2201 of sheet 2109*c* of the second document 2101. Finally, the third image 2305 provides the resulting corresponding area in a document in which the sheet 2109*c* is substituted into document 1701 in lieu of sheet 1709*c*.

As sheet 2109*c* is personalized with hatchmarking 2307 used to personalize the relevant portion of the second document 2101, the hatchmarking of the sheet 2109*c* does not match the hatchmarking 2309 that corresponds to the personalization of the first document 1701. Similarly, the cutout 2105*k* reveals a personalization of the sheet below 1709*d*, which does not match the hatchmarking 2307. Rather, the personalization of the first document 1701 at the location of cutout 2105*k* revealed through the window 2105*k*, namely, the personalization marking through the cutout 1705*k* and the original guilloche pattern of the original pre-personalization in the surrounding area. Furthermore, the personalization of the second document on page 2109*c* made through the see-through window 2105*h* is visible through the see-through window 1705*g*; namely, the personalization of the second document through the cutout 2105*h*. As those personalizations do not match the surrounding personalization, it easily reveals that page 1709*b* and 2109*c* do not belong to the same document. Thus, the swapping of pages is easily discerned by a person examining the first multipage security document 1701.

From the foregoing it is apparent that an efficient and secure mechanism for protecting multi-page security documents against fraud is provided by a mechanism in which unique rainbow text maybe added to multi-page security articles during a personalization phase of the multi-page security articles. This protection is particularly useful in protecting against counterfeiting attacks in which a sheet from one document is substituted for a sheet in another.

Although specific embodiments of the invention have been described and illustrated, the invention is not to be limited to the specific forms or arrangements of parts so described and illustrated. The invention is limited only by the claims.

I claim:

1. A method for personalizing a multipage security document, the method comprising:

on a sequence of pages:

placing a laser-alterable ink layer on a personalization area of an edge of each of the sequence of pages, thereby producing an inked personalization area;

revealing a portion of the personalization area of each of the sequence of pages relative to a page above said each of the sequence of pages such that a personalization portion of each two consecutive pages in said sequence of pages are located adjacent to one another thereby producing a two-dimensional multi-page personalization section;

creating a pattern on the two-dimensional multi-page personalization section by altering the inked personalization area in the revealed portion of each page of said sequence of pages by exposing said revealed portions to a laser, such that a pattern is visible when the revealed portions of a sequence of pages are viewed simultaneously and revealing said portion of each page of said sequence of pages by bending the security document such that for any two adjacent sheets of said personalization zone, a portion of a lower of said two adjacent sheets is exposed beyond an edge of an upper of said two adjacent sheets wherein responsive to said bending, said portion of each page of said sequence of pages is revealed as a result of angle-cut edges of the multipage security document such that for any two adjacent sheets of said multi-page personalization section, a portion of a lower sheet of said two adjacent sheets is exposed beyond an edge of an upper sheet of said two adjacent sheets.

2. The method of claim 1 wherein the laser-alterable ink layer are lines of a guilloche pattern on an exposed portion of each page and wherein the step of altering the inked personalization area in the revealed portion of each page comprises exposing portions of the lines of the guilloche pattern to laser and thereby altering the lines of the guilloche pattern.

3. The method of claim 2 wherein the exposure to laser changes the original color of the laser-alterable ink layer.

4. The method of claim 1 wherein the exposure to laser bleaches the laser-alterable ink layer.

5. The method of claim 1 wherein at least one upper sheet additionally contains an internal cutout window that responsive to said bending reveals an internal portion of a lower sheet such that laser personalization of the upper sheet causes personalization on the lower sheet that corresponds to the personalization of the upper sheet wherein the personalization pattern produced on the lower sheet in a see-through window fits like a puzzle piece into the personalization pattern produced on the upper sheet.

6. The method claim 5 wherein at least one upper sheet contains an irregular edge revealing an irregularly shaped personalization area of a lower sheet such that laser personalization of the upper sheet causes personalization on the lower sheet that corresponds to the personalization of the upper sheet wherein the personalization pattern produced on the lower sheet in the irregularly shaped personalization area fits like a puzzle piece into the personalization pattern produced on the upper sheet.

7. A multipage security document, comprising:

a sequence of pages:

a laser-alterable ink layer placed on a personalization area of an edge of each of the sequence of pages;

a portion of the personalization area of each of the sequence of pages relative to a page above said each of the sequence of pages is revealed such that a personalization portion of each two consecutive pages in said sequence of pages are located adjacent to one another thereby producing a two-dimensional multi-page personalization section;

a pattern on the two-dimensional multi-page personalization section created by altering the ink on said personalization area in the revealed portion of each page of said sequence of pages by exposing said revealed portions to a laser, such that the pattern is visible when the revealed portions of a sequence of pages are viewed simultaneously; and said portion of each page of said sequence of pages is revealed by bending the security document such that for any two adjacent sheets of said personalization zone, a portion of a lower of said two adjacent sheets is exposed beyond an edge of an upper of said two adjacent sheets wherein responsive to said bending, said portion of each page of said sequence of pages is revealed as a result of angle-cut edges of the multipage security document such that for any two adjacent sheets of said multi-page personalization section, a portion of a lower sheet of said two adjacent sheets is exposed beyond an edge of an upper sheet of said two adjacent sheets.

8. The multipage security document of claim 7, wherein the laser-alterable ink layer are lines of a guilloche pattern on the exposed portion of each page, and wherein portions of the lines of the guilloche pattern exposed to the laser have altered those lines of the guilloche pattern.

9. The multipage security document of claim 7, wherein the original color of the laser-alterable ink layer changes on exposure to the laser.

10. The multipage security document of claim 7, wherein the laser-alterable ink layer is bleached on exposure to the laser.

11. The multipage security document of claim 7, wherein at least one upper sheet contains an internal cutout window that responsive to said bending reveals an internal portion of a lower sheet, and a personalization pattern produced on the lower sheet in a see-through window fits like a puzzle piece into a personalization pattern produced on the upper sheet.

12. The multipage security document of claim 7, wherein at least one upper sheet contains an irregular edge revealing an irregularly shaped personalization area of a lower sheet, and a personalization pattern produced on the lower sheet in the irregularly shaped personalization area fits like a puzzle piece into the personalization pattern produced on the upper sheet.

13. A method for personalizing a multipage security document, the method comprising:

on a sequence of pages:

placing a laser-alterable ink layer on a personalization area of an edge of each of the sequence of pages, thereby producing an inked personalization area;

revealing a portion of the personalization area of each of the sequence of pages relative to a page above said each of the sequence of pages such that a personalization portion of each two consecutive pages in said sequence of pages are located adjacent to one another thereby producing a two-dimensional multi-page personalization section;

creating a pattern on the two-dimensional multi-page personalization section by altering the inked personalization area in the revealed portion of each page of said sequence of pages by exposing said revealed portions to a laser, such that a pattern is visible when the revealed portions of a sequence of pages are viewed simultaneously and revealing said portion of each page of said sequence of pages by bending the security document such that for any two adjacent sheets of said personalization zone, a portion of a lower of said two adjacent sheets is exposed beyond an edge of an upper of said two adjacent sheets, wherein at least one upper sheet additionally contains an internal cutout window that responsive to said bending reveals an internal portion of a lower sheet such that laser personalization of the upper sheet causes personalization on the lower sheet that corresponds to the personalization of the upper sheet wherein the personalization pattern produced on the lower sheet in a see-through window fits like a puzzle piece into the personalization pattern produced on the upper sheet.

14. A multipage security document, comprising:

a sequence of pages:

a laser-alterable ink layer placed on a personalization area of an edge of each of the sequence of pages;

a portion of the personalization area of each of the sequence of pages relative to a page above said each of the sequence of pages is revealed such that a personalization portion of each two consecutive pages in said sequence of pages are located adjacent to one another thereby producing a two-dimensional multi-page personalization section;

a pattern on the two-dimensional multi-page personalization section created by altering the ink on said personalization area in the revealed portion of each page of said sequence of pages by exposing said revealed portions to a laser, such that the pattern is visible when the revealed portions of a sequence of pages are viewed simultaneously; and said portion of each page of said sequence of pages is revealed by bending the security document such that for any two adjacent sheets of said personalization zone, a portion of a lower of said two adjacent sheets is exposed beyond an edge of an upper of said two adjacent sheets, wherein at least one upper sheet additionally contains an internal cutout window that responsive to said bending reveals an internal portion of a lower sheet such that laser personalization of the upper sheet causes personalization on the lower sheet that corresponds to the personalization of the upper sheet wherein the personalization pattern produced on the lower sheet in a see-through window fits like a puzzle piece into the personalization pattern produced on the upper sheet.

* * * * *